(12) United States Patent
Takashima et al.

(10) Patent No.: US 7,134,785 B2
(45) Date of Patent: Nov. 14, 2006

(54) CAPACITANCE TEMPERATURE SENSOR AND TEMPERATURE MEASURING DEVICE

(75) Inventors: Hiroshi Takashima, Ibaraki (JP); Akira Shoji, Ibaraki (JP); Ruiping Wang, Ibiraki (JP); Naoki Shirakawa, Ibaraki (JP); Mitsuru Itoh, Kanagawa (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 45 days.

(21) Appl. No.: 11/114,110

(22) Filed: Apr. 26, 2005

(65) Prior Publication Data

US 2005/0238081 A1    Oct. 27, 2005

(30) Foreign Application Priority Data

Apr. 27, 2004    (JP) .................. P. 2004-132133

(51) Int. Cl.
*H01G 7/00*    (2006.01)
*G01K 7/34*    (2006.01)
(52) U.S. Cl. .................. 374/184; 257/306; 361/282
(58) Field of Classification Search ............... 374/184, 374/182; 257/306; 361/282, 244.1, 271, 361/276
See application file for complete search history.

(56) References Cited

U.S. PATENT DOCUMENTS

| 3,649,891 A | * | 3/1972 | Lawless | 361/276 |
| 4,545,254 A | * | 10/1985 | Lawless et al. | 73/714 |
| 5,407,276 A | * | 4/1995 | Jones | 374/184 |
| 5,483,414 A | * | 1/1996 | Turtiainen | 361/282 |
| 5,745,336 A | * | 4/1998 | Saito et al. | 361/321.5 |
| 6,740,333 B1 | * | 5/2004 | Takamatsu et al. | 438/3 |
| 6,900,497 B1 | * | 5/2005 | Agarwal et al. | 257/306 |
| 6,954,235 B1 | * | 10/2005 | Russell et al. | 349/38 |
| 7,042,230 B1 | * | 5/2006 | Izadnegahdar | 324/609 |
| 2004/0156164 A1 | * | 8/2004 | Lanheer et al. | 361/311 |

FOREIGN PATENT DOCUMENTS

JP    56085818 A    *    7/1981

OTHER PUBLICATIONS

Instrumentation and methods for low temperature measurements in high magnetic fields, H.H. Sample and L.G. Rubin, CRYOGENICS. Nov. 1977, p. 597-606.
Hiroshi Takashima, et al. "Influence of a degraded $SrTiO_3$ layer at the $YBa_2Cu_3O_{7-\delta}$—$SrTiO_3$ interface on the dielectric behavior at cryogenic temperature", *Cryogenics*, Butterworth Scientific, Guilford, GB, XP04783068, vol. 45, No. 4 (Apr. 2005), pp. 300-303.

\* cited by examiner

*Primary Examiner*—Gail Verbitsky
(74) *Attorney, Agent, or Firm*—Morgan, Lewis & Bockius LLP

(57) ABSTRACT

A capacitance temperature sensor in which temperature is measured by detecting capacitance of a parallel plate condenser which comprises a dielectric material comprising strontium titanate single crystal in which (a) 30% by weight or less of oxygen-16 or (b) 30% by weight to 50% by weight of oxygen-16 is substituted with oxygen-18 isotope.

8 Claims, 9 Drawing Sheets

OXYGEN-18 ISOTOPE SUBSTITUTION: 0 wt%

OXYGEN-18 ISOTOPE SUBSTITUTION: 26 wt%

OXYGEN-18 ISOTOPE SUBSTITUTION: 0 wt%

OXYGEN-18 ISOTOPE SUBSTITUTION: 38 wt%

CAPACITANCE TEMPERATURE SENSOR AND TEMPERATURE MEASURING DEVICE

BACKGROUND OF THE INVENTION

1. Field of the Invention

The present invention relates to a capacitance temperature sensor in which temperature is measured by detecting capacitance of a parallel plate condenser which comprises a dielectric material comprising strontium titanate single crystal, and a temperature measuring device using the capacitance temperature sensor.

2. Brief Description of the Background Art

Bulk single crystal strontium titanate (hereinafter referred to as "STO") is known as a quantum paraelectric material and its dielectric-constant is 20,000 or more at 4.2 K. The dielectric constant of the bulk single crystal strontium titanate depends on bias and stress and decreases according to them.

U.S. Pat. No. 3,649,891 discloses use of a ferroelectric material as a capacitance temperature sensor.

Bulk single crystal STO exhibits a high dielectric constant at low temperatures as mentioned above and thus is an extremely useful dielectric material for superconducting devices or semiconductor devices which are used at low temperatures.

On the other hand, when a ferromagnetic material is used as a capacitance temperature sensor as disclosed in the related art, temperature change causes residual polarization. As a result, hysteresis appears, making it impossible to obtain a capacitance temperature sensor having a one-to-one relationship between the temperature and the capacitance measured.

Further, a capacitance temperature sensor made of a ferroelectric material as disclosed in the related art has been commercialized, but its sensitivity and absolute sensitivity are as low as 20 pF/K and 0.02, respectively. Such a capacitance temperature sensor is thus disadvantageous in that its precision in temperature measurement is low.

SUMMARY OF THE INVENTION

An object of the present invention is to provide a capacitance temperature sensor having a high dielectric constant at low temperatures, no residual polarization, a high temperature sensitivity ($S=\Delta C/\Delta T$), a high absolute sensitivity ($Sd=(T/C) \Delta C/\Delta T$) and an excellent temperature resolution, wherein the capacitance temperature sensor comprises a quantum paraelectric parallel-plate condenser comprising strontium titanate single crystal in which 30% by weight or less of oxygen-16 is substituted with oxygen-18 isotope.

Another object of the present invention is to provide a capacitance temperature sensor having a high dielectric constant at low temperatures, a high temperature sensitivity ($S=\Delta C/\Delta T$), a high absolute sensitivity ($Sd=(T/C) \Delta C/\Delta T$) and an excellent temperature resolution, wherein the capacitance temperature sensor comprises a ferroelectric parallel-plate condenser comprising strontium titanate single crystal in which 35% by weight to 50% by weight of oxygen-16 is substituted with oxygen-18 isotope.

The present invention relates to the following (1) to (5).

(1) A capacitance temperature sensor in which temperature is measured by detecting capacitance of a parallel plate condenser which comprises a dielectric material comprising strontium titanate single crystal in which 30% by weight or less of oxygen-16 is substituted with oxygen-18 isotope.

(2) A capacitance temperature sensor in which temperature is measured by detecting capacitance of a parallel plate condenser which comprises a dielectric material comprising strontium titanate single crystal in which 30% by weight to 50% by weight of oxygen-16 is substituted with oxygen-18 isotope.

(3) A temperature measuring device which comprises the capacitance temperature sensor according to (1) or (2), a meter for measuring capacitance of the capacitance temperature sensor, and an apparatus for determining the temperature from the measured capacitance.

(4) The temperature measuring device according to (3), wherein the meter is a capacitance bridge.

(5) The temperature measuring device according to (3) or (4), wherein the temperature is measured in the magnetic field.

DETAILED DESCRIPTION OF THE INVENTION

Unless otherwise indicated, "%" as used herein means "% by weight".

In accordance with the present invention, when strontium titanate single crystal in which 30% or less of oxygen-16 is substituted with oxygen-18 isotope is used, a capacitance temperature sensor having a high dielectric constant at low temperatures can be obtained. In particular, when strontium titanate single crystal in which 26% of oxygen-16 is substituted with oxygen-18 isotope is used, a capacitance temperature sensor having a dielectric constant of 50,000 or more, and hence a quantum-paraelectricity at a temperature of 4.2 K and hence no residual polarization and a one-to-one relationship between the capacitance measured and the temperature can be obtained.

The first embodiment of the present invention is described hereinafter in connection with FIGS. 1 to 5.

Figure 1:
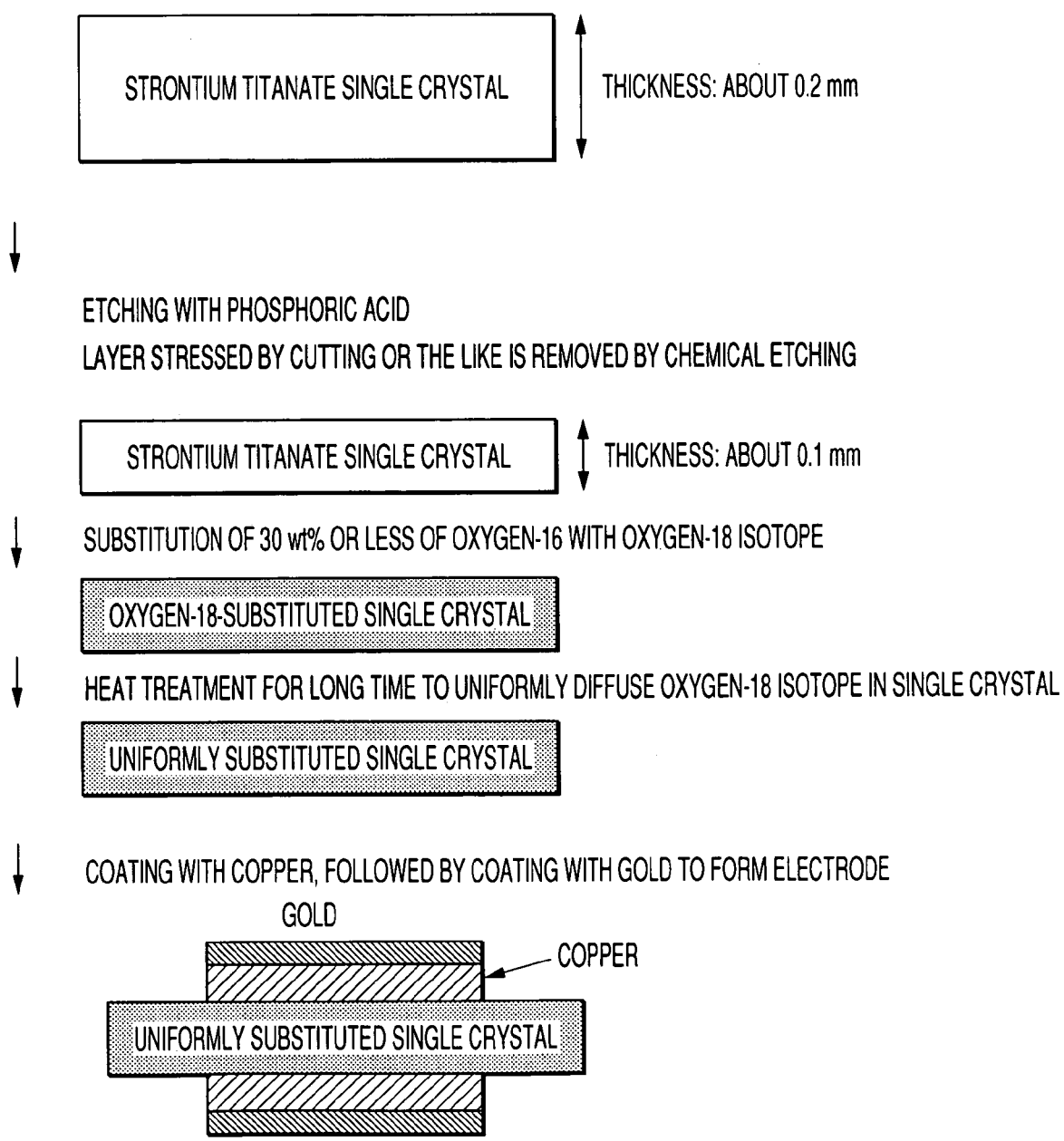
FIG. 1 shows a process for preparing a capacitance temperature sensor according to a first embodiment of the present invention.

FIG. 1 shows a process for preparing the capacitance temperature sensor according to the first embodiment of the present invention.

The strontium titanate single crystal has a low dielectric constant layer formed on the surface thereof by lattice defect developed in the stage of cutting, shaping or growth. Therefore, the low dielectric constant layer is removed, e.g., by etching strontium titanate single crystal having a thickness of 200 μm with phosphoric acid or chemically etching a layer stressed by cutting or the like to reduce the thickness thereof to 100 μm. Thereafter, 30% or less, e.g., 26%, of oxygen-16 in the strontium titanate single crystal is substituted with oxygen-18 isotope. The lower limit of the substituted amount is not limited, but it is preferably more than 0%. The substitution of oxygen-16 with oxygen-18 isotope is carried out by enclosing oxygen-18 isotope and the strontium titanate single crystal in a sealed vessel, and then subjecting the mixture to heat treatment at a temperature as high as 600° C. to 1,000° C. The substituted amount of oxygen-16 with oxygen-18 isotope depends on the time for the heat treatment. Thereafter, in order to diffuse oxygen-18 isotope in the sample, the material is subjected to heat treatment in vacuo for a long time, e.g., at 1,050° C. for 30 days. Thereafter, vacuum deposition is carried out to form a copper film on the material, e.g., at a thickness of 100 nm or more. Thereafter, gold is vacuum-deposited on the material, e.g., at a thickness of 100 nm or more, to form an electrode to obtain a capacitance temperature sensor comprising a quantum paraelectric parallel-plate condenser. Also, chromium can also be used instead of silver or gold.

FIG. 2 shows substitution effect on the dielectric constant of the capacitance temperature sensor in which oxygen-16 in the strontium titanate single crystal is substituted with oxygen-18 isotope.

Figure 2A:
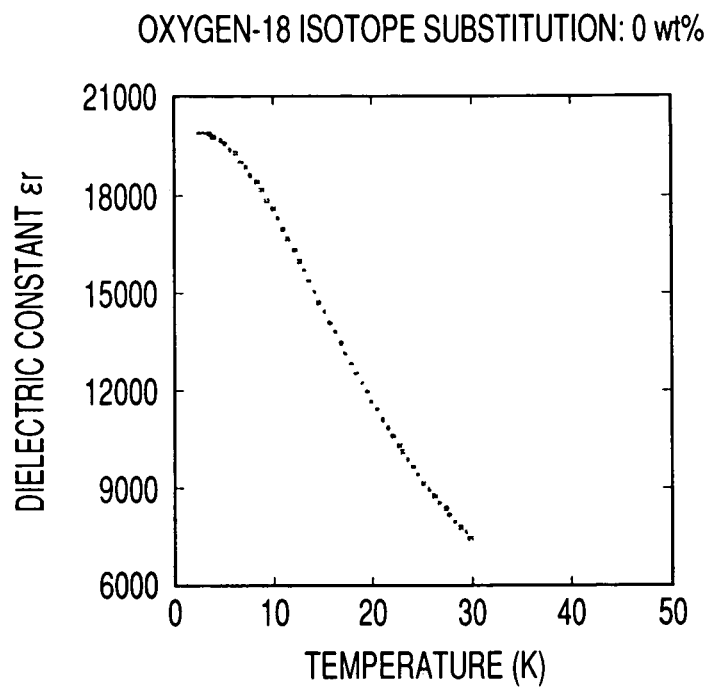
FIG. 2 shows substitution effects on the dielectric constant of the capacitance temperature sensor when oxygen-16 in the strontium titanate single crystal is substituted with oxygen-18 isotope according to the first embodiment of the present invention.
Figure 2B:
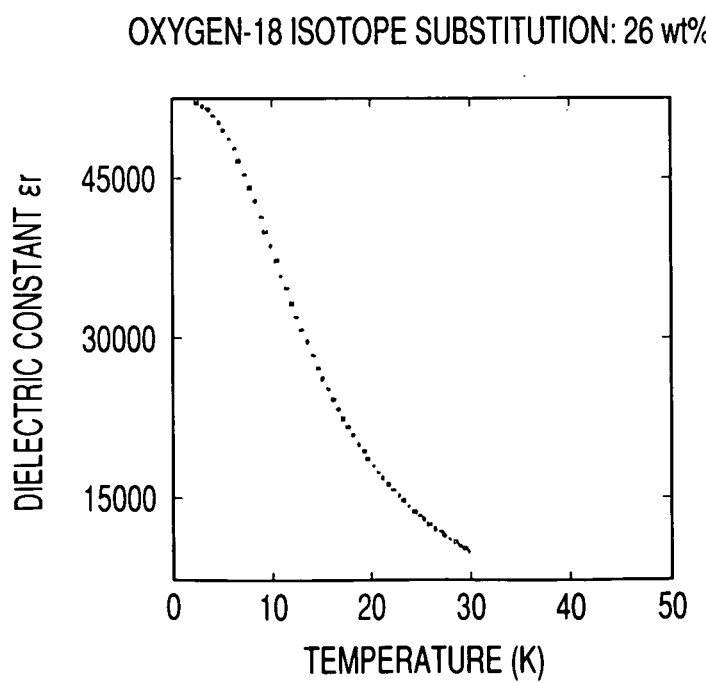

FIG. 2(A) shows temperature dependency of the dielectric constant when the substitution amount of oxygen-18 isotope is 0%, i.e., oxygen-16 is not substituted with oxygen-18 isotope. FIG. 2(B) shows temperature dependency of the dielectric constant when the substituted amount of oxygen-18 isotope is 26%.

As can be seen in these drawings, both two characteristic curves show quantum-paraelectricity.

Regarding the temperature dependency of the dielectric constant in FIG. 2(A), the dielectric constant is about 20,000 at a temperature of 2.2 K, which shows a quantum-paraelectricity in which the dielectric constant saturates within an extremely low range.

On the other hand, regarding the temperature dependency of the dielectric constant in FIG. 2(B), wherein 26% of oxygen-16 in the strontium titanate single crystal is substituted with oxygen-18, the dielectric constant exceeds 50,000 at 2.2 K, which shows that the quantum-paraelectricity is maintained. The parallel-plate capacitance C is calculated from dielectric constant "$\epsilon_r \epsilon_o$", electrode area "A" and thickness "t" using the equation "$C=\epsilon_r\epsilon_o A/t$" wherein so is the dielectric constant of vacuum.

The performance of a capacitance temperature sensor is normally evaluated by a change of capacitance of the element per K at arbitrary temperature (sensitivity) ($S=\Delta C/\Delta T$) and a value obtained by dividing the sensitivity by the capacitance and multiplying the quotient by the temperature (absolute temperature) ($Sd=(T/C) \Delta C/\Delta T$).

FIG. 3 shows enhancement of the sensitivity S of the capacitance temperature sensor in which oxygen-16 in the strontium titanate single crystal is substituted with oxygen-18 isotope.

Figure 3A:
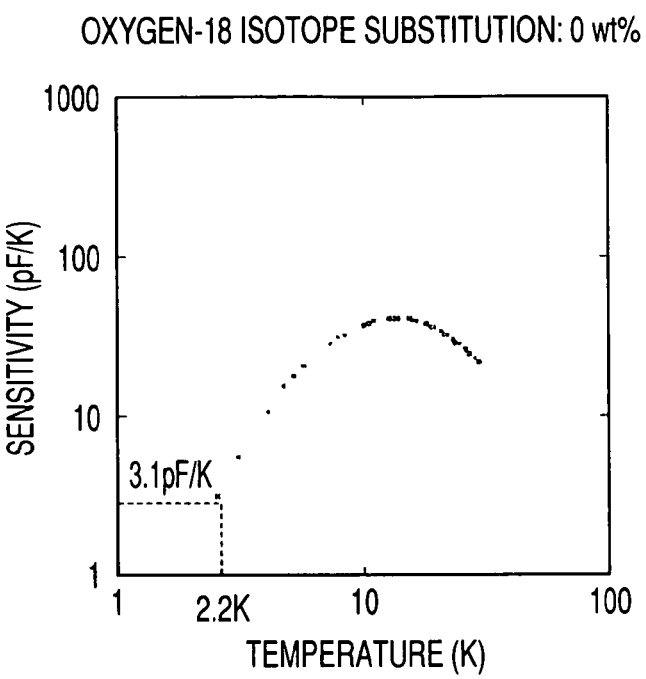
FIG. 3 shows enhancement of the sensitivity S of the capacitance temperature sensor when oxygen-16 in the strontium titanate single crystal is substituted with oxygen-18 isotope according to the first embodiment of the present invention.
Figure 3B:
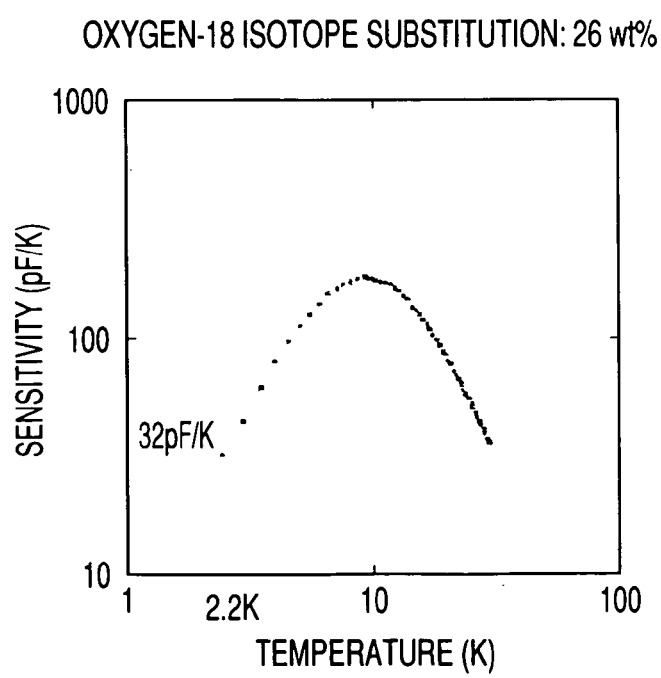

FIG. 3(A) shows the sensitivity S when the substituted amount of oxygen-18 isotope is 0%. FIG. 3(B) shows the sensitivity S when the substituted amount of oxygen-18 isotope is 26%.

As can be seen in these drawings, the sensitivity S in FIG. 3(A) in which the substituted amount of oxygen-18 isotope is 0% is 3.1 pF/K at 2.2 K, whereas the sensitivity S in FIG. 3(B) in which the substituted amount of oxygen-18 isotope is 26% is 32 pF/K, which shows that the sensitivity is improved.

FIG. 4 shows enhancement of the absolute sensitivity Sd of a capacitance temperature sensor in which oxygen-16 in the strontium titanate single crystal is substituted with oxygen-18 isotope.

Figure 4A:
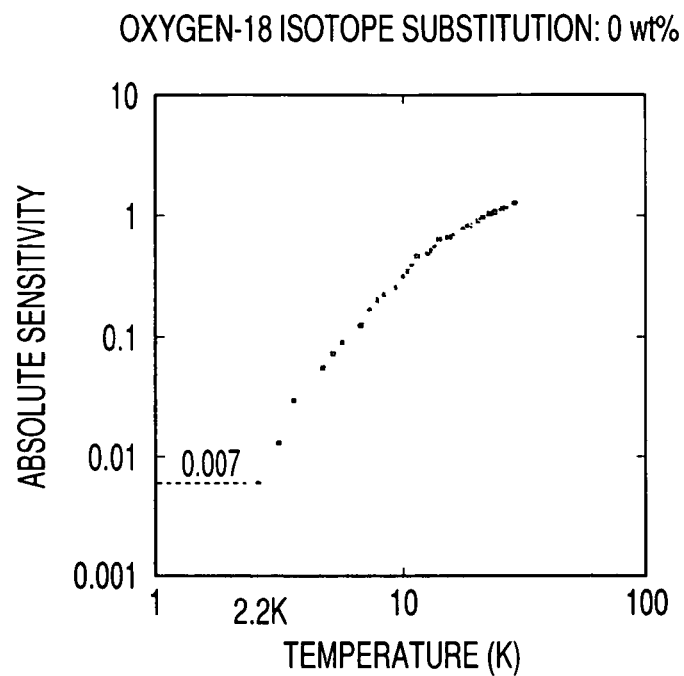
FIG. 4 shows enhancement of the absolute sensitivity Sd of the capacitance temperature sensor when oxygen-16 in the strontium titanate single crystal is substituted with oxygen-18 isotope according to the first embodiment of the present invention.
Figure 4B:
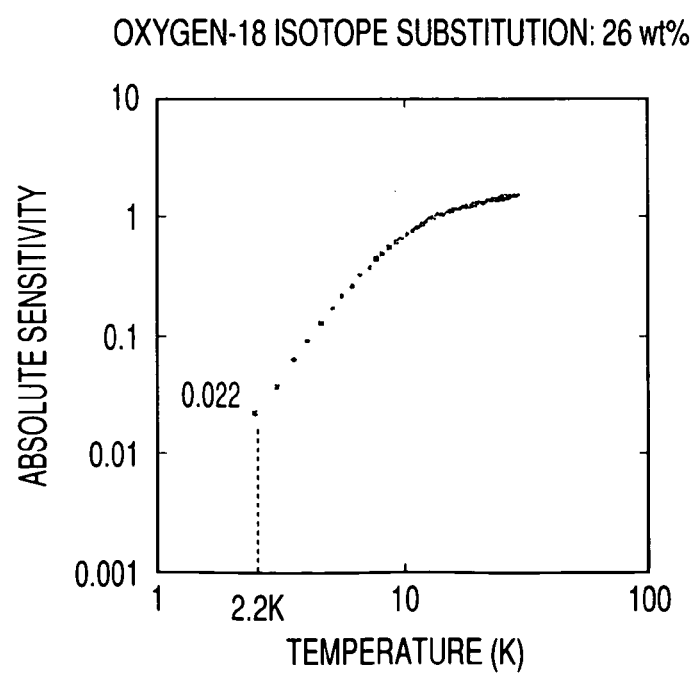

FIG. 4(A) shows the absolute sensitivity Sd when the substituted amount of oxygen-18 isotope is 0%. FIG. 4(B) shows the absolute sensitivity Sd when the substituted amount of oxygen-18 isotope is 26%.

As can be seen in these drawings, the absolute sensitivity Sd in FIG. 4(A) in which the substituted amount of oxygen-18 isotope is 0% is 0.007 at 2.2 K, whereas the absolute sensitivity Sd in FIG. 4(B) in which the substituted amount of oxygen-18 isotope is 26% is 0.022, which is at least 3 times as high as the absolute sensitivity Sd in FIG. 4(A), which shows that the temperature can be measured at high accuracy. As a result, it is shown that the high sensitivity is obtained in a quantum paraelectric material and influence by residual polarization is not affected so that the capacitance temperature sensor in FIG. 4(B) can be used as an absolute thermometer.

Figure 5:
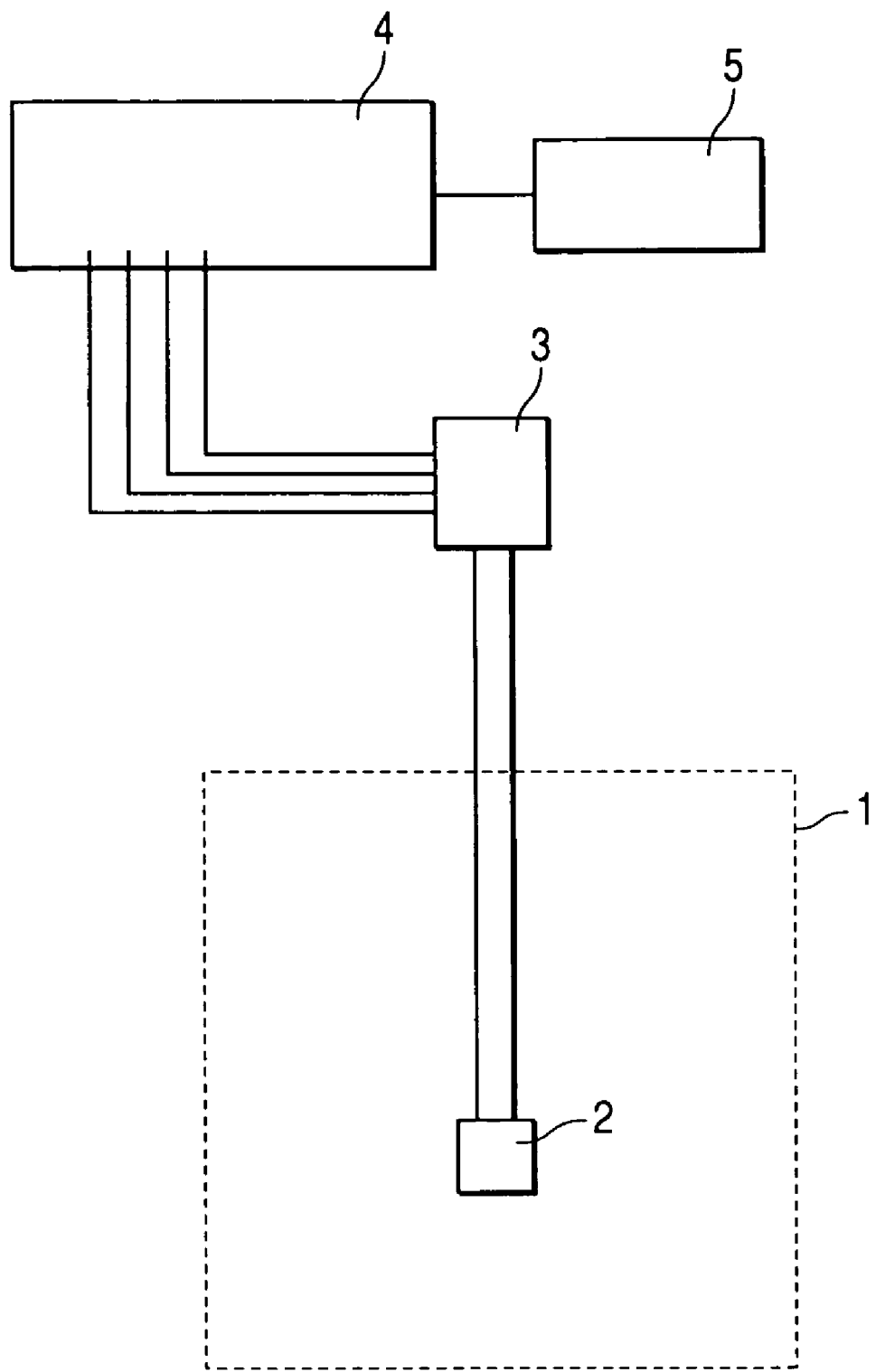
FIG. 5 shows constitution of a temperature measuring device comprising the capacitance temperature sensor according to the first embodiment of the present invention.

FIG. 5 shows constitution of a temperature measuring device comprising the capacitance temperature sensor according to the first embodiment of the present invention.

In FIG. 5, the reference numeral 1 indicates a low temperature vessel; the reference numeral 2 indicates a capacitance temperature sensor comprising a parallel plate condenser provided in an object to be measured (not shown) disposed in the low temperature vessel 1; the reference numeral 3 indicates a low temperature probe; the reference numeral 4 indicates a meter, such as an LCR meter and a capacitance bridge, for measuring capacitance of the capacitance temperature sensor; and the reference numeral 5 indicates an apparatus for determining the temperature from the capacitance measured, such as a personal computer.

In general, the capacitance is preferably measured in the magnetic field because it is not affected by the magnetic field.

The second embodiment of the present invention will be described in connection with FIGS. 6 to 9.

Figure 6:
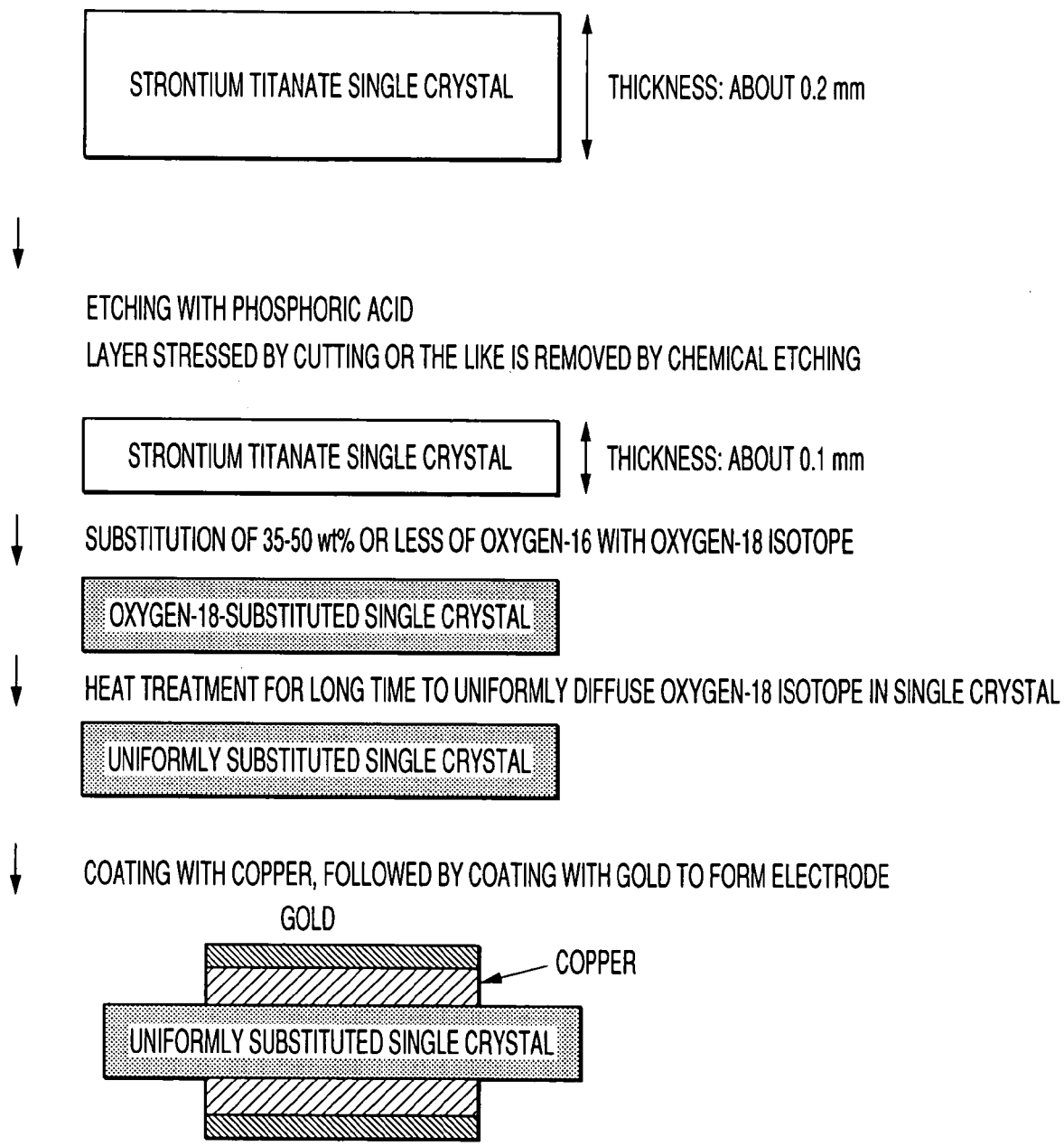
FIG. 6 shows a process for preparing a capacitance temperature sensor according to a second embodiment of the present invention.

FIG. 6 shows a process for preparing a capacitance temperature sensor according to the second embodiment of the present invention.

Strontium titanate single crystal has a low dielectric constant layer formed on the surface thereof by lattice defect developed in the stage of cutting, shaping or growth. Therefore, the low dielectric constant layer is removed, e.g., by etching strontium titanate single crystal having a thickness of 200 µm with phosphoric acid or chemically etching a layer stressed by cutting or the like to reduce the thickness thereof to 100 µm. Thereafter, 35% to 50%, e.g., 38%, of oxygen-16 in the strontium titanate single crystal is substituted with oxygen-18 isotope. The substitution of oxygen-16 with oxygen-18 isotope is carried out by enclosing oxygen-18 isotope and the strontium titanate single crystal in a sealed vessel, and then subjecting the mixture to heat treatment at a temperature as high as 600° C. to 1,000° C. The substituted amount of oxygen-16 with oxygen-18 isotope depends on the time for the heat treatment. Thereafter, in order to diffuse oxygen-18 isotope in the sample, the material is subjected to heat treatment in vacuo for a long time, e.g., at 1,050° C. for 30 days. Thereafter, vacuum deposition is carried out to form a copper film on the material, e.g., at a thickness of 100 nm or more. Thereafter, gold is vacuum-deposited on the material, e.g., at a thickness of 100 nm or more, to form an electrode to obtain a capacitance temperature sensor comprising a quantum paraelectric parallel-plate condenser. Also, chromium can also be used instead of silver or gold.

FIG. 7 shows substitution effect on the dielectric constant of the capacitance temperature sensor in which oxygen-16 in the strontium titanate single crystal is substituted with oxygen-18 isotope.

Figure 7A:
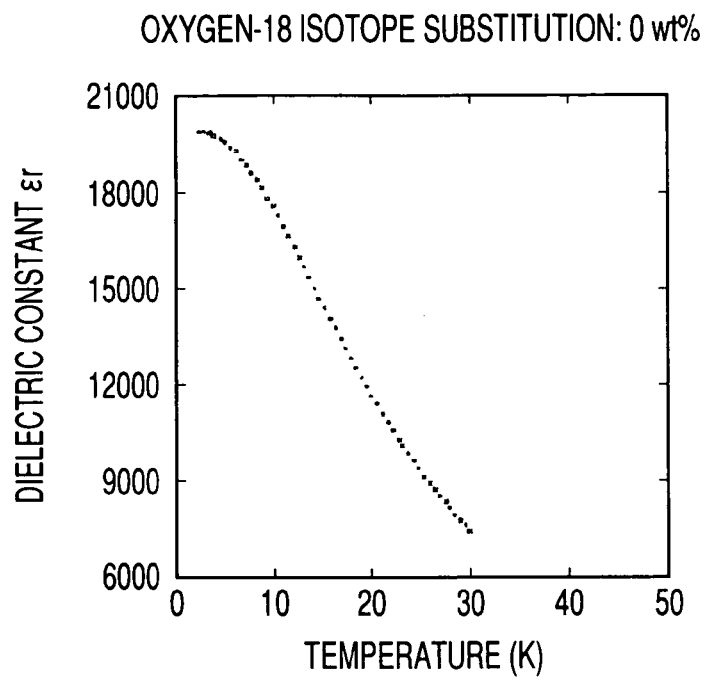
FIG. 7 shows effect effects on the dielectric constant of the capacitance temperature sensor when oxygen-16 in the strontium titanate single crystal is substituted with oxygen-18 isotope according to the second embodiment of the present invention.
Figure 7B:
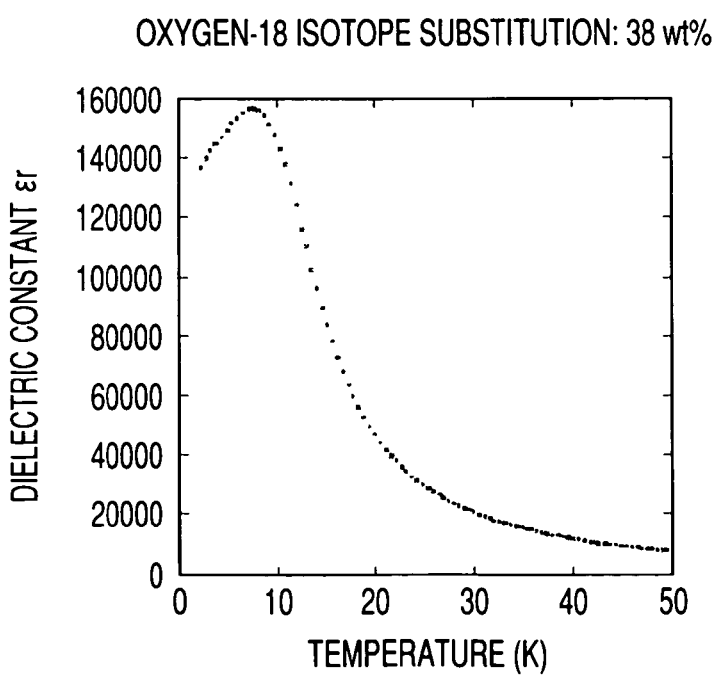

FIG. 7(A) shows temperature dependency of the dielectric constant when the substituted amount of oxygen-18 isotope is 0%. FIG. 7(B) shows temperature dependency of the dielectric constant when the substituted amount of oxygen-18 isotope is 38%.

As can be seen in these drawings, FIG. 7(A) shows quantum-paraelectricity while FIG. 7(B) shows ferroelectricity.

Regarding the temperature dependency of the dielectric constant in FIG. 7(A), the dielectric constant is about 20,000 or more at a temperature of 2.2 K, which shows a quantum-paraelectricity in which the dielectric constant saturates within an extremely low range.

On the other hand, regarding the temperature dependency of the dielectric constant in FIG. 7(B) in which 38% of oxygen-16 in the strontium titanate single crystal is substituted with oxygen-18 isotope, the dielectric constant exceeds 100,000 at 2.2 K, which shows that the capacitance temperature sensor has ferroelectricity.

FIG. 8 shows enhancement of the sensitivity S of the capacitance temperature sensor in which oxygen-16 in the strontium titanate single crystal is substituted with oxygen-18 isotope.

Figure 8A:
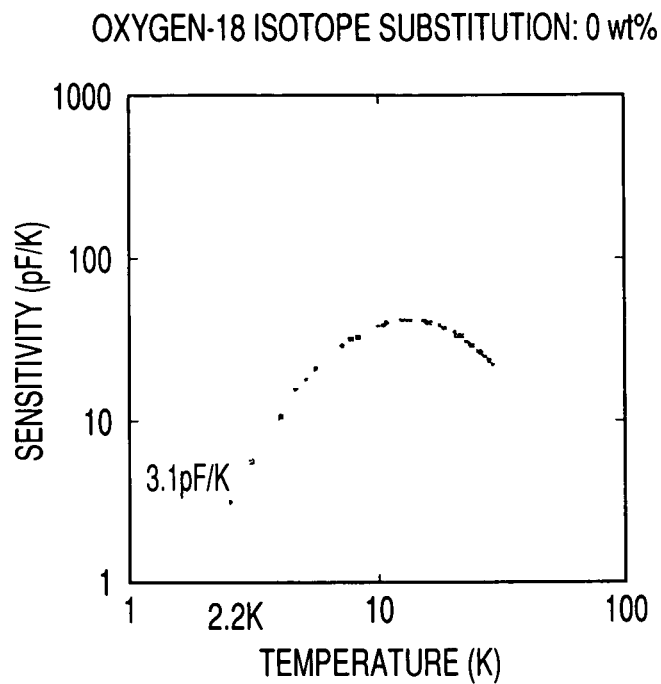
FIG. 8 shows enhancement of the sensitivity S of the capacitance temperature sensor when oxygen-16 in the strontium titanate single crystal is substituted with oxygen-18 isotope according to the second embodiment of the present invention.
Figure 8B:
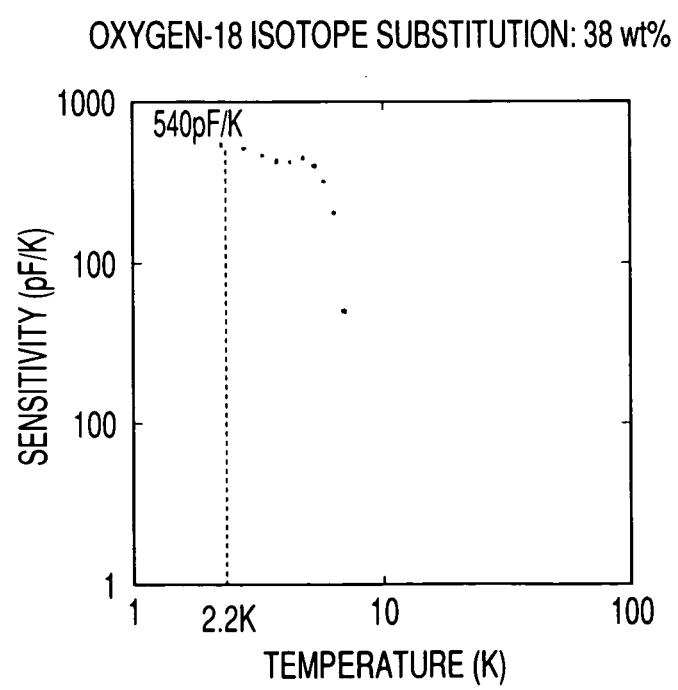

FIG. 8(A) shows the sensitivity S when the substituted amount of oxygen-18 isotope is 0%. FIG. 8(B) shows the sensitivity S when the substituted amount of oxygen-18 isotope is 38%.

As can be seen in these drawings, the sensitivity S in FIG. 8(B) in which the substituted amount of oxygen-18 isotope is 0% is 3.1 pF/K at 2.2 K, whereas the sensitivity S in FIG. 8(B) in which the substituted amount of oxygen-18 isotope is 38% is as high as 500 pF/K, which shows that the sensitivity is remarkably improved.

FIG. 9 shows enhancement of the absolute sensitivity Sd of the capacitance temperature sensor in which oxygen-16 in the strontium titanate single crystal is substituted with oxygen-18 isotope.

Figure 9A:
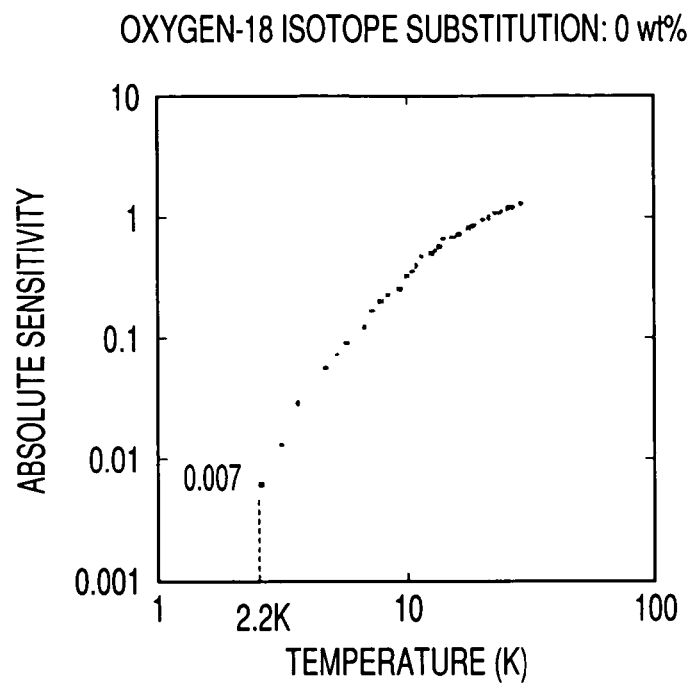
FIG. 9 shows enhancement of the absolute sensitivity Sd of the capacitance temperature sensor when oxygen-16 in the strontium titanate single crystal is substituted with oxygen-18 isotope according to the second embodiment of the present invention.
Figure 9B:
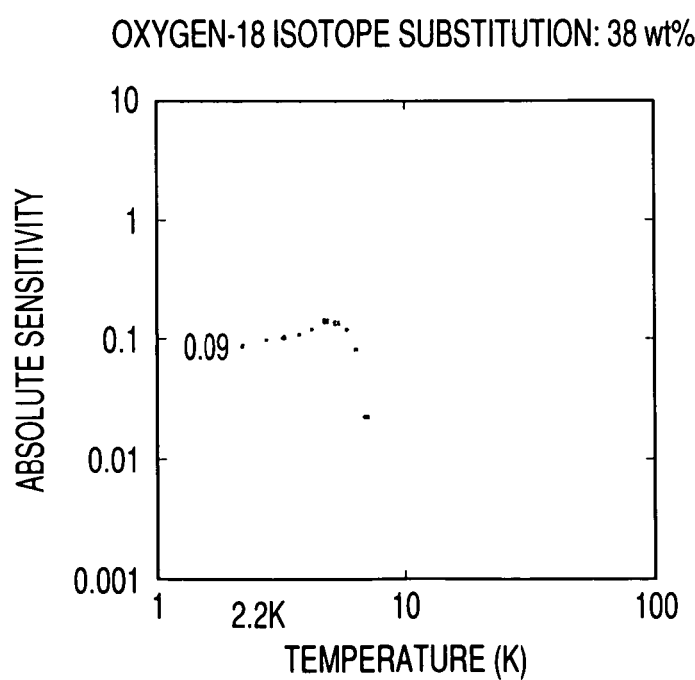

FIG. 9(A) shows the absolute sensitivity Sd when the substituted amount of oxygen-18 isotope is 0%. FIG. 9(B) shows the absolute sensitivity Sd when the substituted amount of oxygen-18 isotope is 38%.

As can be seen in these drawings, the absolute sensitivity Sd in FIG. 9(A) in which the substituted amount of oxygen-18 isotope is 0% is 0.007 at 2.2 K, whereas the absolute sensitivity Sd in FIG. 9(B) in which the substituted amount of oxygen-18 isotope is 38% is 0.095, which is at least 10 times as high as the absolute sensitivity Sd in FIG. 9(A), which shows that the temperature can be measured at high accuracy. As a result, since ferroelectricity is exhibited, the capacitance temperature sensor in FIG. 9(B) has remarkably high sensitivity, although showing residual polarization.

The constitution of the temperature measuring device comprising a capacitance temperature sensor according to the second embodiment of the present invention is the same as that shown in FIG. 5 and is omitted.

While the invention has been described in detail and with reference to specific embodiments thereof, it will be apparent to one skill in the art that various changes and modifications can be made therein without departing from the spirit and scope thereof. All references cited herein are incorporated in their entirety.

This application is based on Japanese patent application No. 2004-132133 filed on Apr. 27, 2004, the entire contents of which are incorporated hereinto by reference.

What is claimed is:

1. A capacitance temperature sensor in which temperature is measured by detecting capacitance of a parallel plate condenser which comprises a dielectric material comprising strontium titanate single crystal in which 30% by weight or less of oxygen-16 is substituted with oxygen-18 isotope.

2. A capacitance temperature sensor in which temperature is measured by detecting capacitance of a parallel plate condenser which comprises a dielectric material comprising strontium titanate single crystal in which 30% by weight to 50% by weight of oxygen-16 is substituted with oxygen-18 isotope.

3. A temperature measuring device which comprises the capacitance temperature sensor according to claim 1, a meter for measuring capacitance of the capacitance temperature sensor, and an apparatus for determining the temperature from the measured capacitance.

4. The temperature measuring device according to claim 3, wherein the meter is a capacitance bridge.

5. The temperature measuring device according to claim 3, wherein the temperature is measured in the magnetic field.

6. A temperature measuring device which comprises the capacitance temperature sensor according to claim 2, a meter for measuring capacitance of the capacitance temperature sensor, and an apparatus for determining the temperature from the measured capacitance.

7. The temperature measuring device according to claim 6, wherein the meter is a capacitance bridge.

8. The temperature measuring device according to claim 6, wherein the temperature is measured in the magnetic field.

* * * * *